US010243637B2

(12) United States Patent
Gutierrez et al.

(10) Patent No.: US 10,243,637 B2
(45) Date of Patent: Mar. 26, 2019

(54) METHOD AND DEVICE FOR PROVIDING A CORRECTION PARAMETER FOR CORRECTION OF CHANNEL STATE INFORMATION

(71) Applicant: Intel IP Corporation, Santa Clara, CA (US)

(72) Inventors: Ismael Gutierrez, Dresden (DE); Rajarajan Balraj, Nuremberg (DE); Ziyang Ju, Dresden (DE); Sriram Sridharan, San Diego, CA (US); Kiran Vanganuru, San Diego, CA (US)

(73) Assignee: Intel IP Corporation, Santa Clara, CA (US)

( * ) Notice: Subject to any disclaimer, the term of this patent is extended or adjusted under 35 U.S.C. 154(b) by 261 days.

(21) Appl. No.: 15/050,557

(22) Filed: Feb. 23, 2016

(65) Prior Publication Data
US 2016/0285536 A1   Sep. 29, 2016

(30) Foreign Application Priority Data

Mar. 23, 2015  (DE) ........................ 10 2015 104 313

(51) Int. Cl.
  *H04B 7/06* (2006.01)
  *H04L 1/00* (2006.01)
  *H04L 1/20* (2006.01)
(52) U.S. Cl.
  CPC ......... *H04B 7/0626* (2013.01); *H04L 1/0039* (2013.01); *H04L 1/20* (2013.01);
  (Continued)

(58) Field of Classification Search
None
See application file for complete search history.

(56) References Cited

U.S. PATENT DOCUMENTS

2004/0266358 A1* 12/2004 Pietraski ............. H04B 1/1027
                                                                  455/67.11
2009/0287970 A1* 11/2009 Iizuka ................... H04L 1/0002
                                                                  714/704
(Continued)

FOREIGN PATENT DOCUMENTS

WO   WO-2014/007539 A1   1/2014
WO   WO-2014/205644 A1   12/2014

OTHER PUBLICATIONS

Chen, et al., "A Novel CQI Calculation Scheme in LTE/LTE-A Systems", 6 pgs., IEEE, 2011.
(Continued)

*Primary Examiner* — Chirag G Shah
*Assistant Examiner* — Srinivasa R Reddivalam
(74) *Attorney, Agent, or Firm* — Schiff Hardin LLP (57) ABSTRACT

A correction circuit (200) for providing at least one correction parameter (206) for correcting channel state information includes: a first input (201) for receiving at least one transport performance indicator (202) indicating a transport performance of data received over a radio channel; a second input (203) for receiving channel state information (204); and an output (205) for providing the at least one correction parameter (206) based on a relationship between the at least one transport performance indicator (202) and the channel state information (204).

23 Claims, 7 Drawing Sheets

(52) U.S. Cl.
CPC ............ *H04B 7/063* (2013.01); *H04B 7/0632* (2013.01); *H04B 7/0639* (2013.01); *H04L 1/0026* (2013.01); *H04L 1/0031* (2013.01)

(56) References Cited

U.S. PATENT DOCUMENTS

| | | | |
|---|---|---|---|
| 2010/0067396 A1* | 3/2010 | Cui | H04L 1/0026 370/252 |
| 2012/0099446 A1* | 4/2012 | Su | H04L 1/0003 370/252 |
| 2013/0182569 A1 | 7/2013 | Bertrand et al. | |
| 2013/0258877 A1 | 10/2013 | Ji et al. | |
| 2013/0322276 A1* | 12/2013 | Pelletier | H04W 72/085 370/252 |
| 2014/0098688 A1 | 4/2014 | Kang et al. | |
| 2014/0307645 A1 | 10/2014 | Ji et al. | |
| 2014/0355469 A1 | 12/2014 | Kang et al. | |
| 2015/0146644 A1 | 5/2015 | Kim et al. | |

OTHER PUBLICATIONS

Office Action and Search Report dated Oct. 3, 2017 for Taiwan Patent Application No. 105104753.

* cited by examiner

METHOD AND DEVICE FOR PROVIDING A CORRECTION PARAMETER FOR CORRECTION OF CHANNEL STATE INFORMATION

FIELD

The disclosure relates to methods and devices for providing at least one correction parameter for correcting channel state information. The disclosure further relates to a device for providing channel state information based on at least one correction parameter.

BACKGROUND

Signals transmitted between components of a radio communication network such as a base station and a mobile terminal may include different kinds of distortion components which can disturb receiver performance.

Wireless communication networks 100 may use channel state information (CSI) and channel quality indicators (CQI) 102 as shown in FIG. 1 to represent the channel quality or the corresponding reception performance. An estimate of channel state information 102 between the transmitted signal at a transmitter 110, e.g. a base station and the received signal at a receiver 120, e.g. a mobile terminal of a communication link may be based on limited observations at the receiver 120. In particular, the CSI may be sensitive to effects not visible in the reference symbols embedded into the downlink stream, e.g. cell specific reference symbols (CRS) or channel state information reference symbols (CSI-RS). Examples for such scenarios are non-colliding interference scenarios, i.e. interferer CRS don't collide with those from serving cell and interferer is not fully loaded and colliding interference with different power in carriers used for reference symbols as compared to data carriers.

A small difference between the coding rate for CSI at the receiver 120 and the coding rate for the transmitted signal at the transmitter 110 is inherent due to the granularity of the modulation and coding scheme (MCS) 104. Also very frequently differences in coding rates between CQI and scheduled MCS are due to "mis-configuration" issues, e.g. wrong CQI to MCS mapping 112. These small differences in coding rate may lead to a significant increase of the block error rate (BLER) 106, e.g. above 10 percent of a target BLER and subsequently an increased error rate of acknowledged/non-acknowledged transport blocks 108.

Methods and devices employed in wireless communication networks constantly have to be improved. In particular, it may be desirable to improve the reporting of channel state information of the mobile receiver in situations as described above.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

FIG. 1 is a schematic diagram of a radio communication network 100 including a base station 110 and a mobile terminal 120.

FIG. 2 is a block diagram of a correction circuit 200 for providing at least one correction parameter 206 for correcting channel state information in accordance with the disclosure.

FIG. 3 is a block diagram of a device 300 for providing channel state information in accordance with the disclosure.

FIG. 4 is a block diagram of a device 400 for providing channel state information in accordance with the disclosure.

FIG. 5 is a block diagram of a correction circuit 500 for providing at least one correction parameter 206a, 206b for correcting channel state information in accordance with the disclosure.

FIG. 6 is a schematic diagram of a method 600 for providing at least one correction parameter for determining channel state information in accordance with the disclosure.

FIG. 7 is a performance diagram 700 illustrating the block error rate of a device according to the disclosure for different exemplary channels.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on UMTS (Universal Mobile Telecommunications System) and 3GPP (3$^{rd}$ Generation Partnership Project) systems. The methods and devices described below may further be implemented in a mobile device (or mobile station or User Equipment (UE)) or a base station (NodeB, eNodeB). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

The methods and devices described in the following sections may process transport blocks based on one or more of the following parameters: channel state information (CSI), channel quality indicators (CQI), mutual information (MI), precoding matrix indicators (PMI), rank indicators (RI) and block error ratio (BLER). A transport block may be referred to as a block of data configured to be transported from one physical or logical unit to a second physical or logical unit. In an LTE (Long Term Evolution) mobile communication system, data from the upper layer or MAC layer given to the physical layer is referred as transport block. For single antenna transmission mode, there may be one transport block which may be generated for each TTI (Transmission Time Interval). The transport block size may be decided by the number of Physical Resource Blocks and the MCS (Modulation and Coding Scheme).

Channel state information (CSI) refers to known channel properties of a communication link. This information describes how a signal propagates from the transmitter to the receiver and represents the combined effect of, for example, scattering, fading, and power decay with distance. The CSI makes it possible to adapt transmissions to current channel conditions, which is crucial for achieving reliable communication with high data rates in multi-antenna systems.

The mutual information (MI) of two random variables is a measure of the variables' mutual dependence. Not limited to real-valued random variables like the correlation coefficient, MI is more general and determines how similar the joint distribution p (X, Y) is to the products of factored marginal distribution p (X) p (Y). The capacity of a channel (channel capacity) is given by the maximum of the mutual information between the input and output of the channel, where the maximization is with respect to the input distribution.

Channel quality indicators are messages that are sent on a communication system (such as a mobile communication system) that provide the remote connection (e.g. base station) with channel quality information. Channel quality information may include carrier level received signal strength indication (RSSI), bit error rate (BER) and other values. In LTE mobile communications CQI is reported by UE to eNB. To predict the downlink channel condition, CQI feedback is applied by the UE. CQI reporting can be based on PMI (Precoding Matrix Indicator) and RI (rank indicator). The higher the CQI value (e.g. from 0 to 15) reported by UE, the higher the modulation scheme may be used (e.g. from QPSK to 64 QAM) and hence, higher coding rates may be used by eNB to achieve higher efficiency. The PMI is used by the UE to indicate to eNB which precoding matrix should be used for downlink transmission. By the RI, UE indicates to eNB the number of layers that should be used for downlink transmission to the UE. RI and PMI can be configured to support MIMO operation (closed loop and open loop spatial multiplexing). Some of the transmission modes, for example transmission modes 4 and 6, use precoding from a well-defined codebook, i.e. the lookup table of cross coupling factors used for precoding shared between UE and eNB to form the transmission layers. Notice that for higher transmission modes precoding indexes are also reported.

A block error rate or ratio is defined as the ratio of the number of erroneous blocks received to the total number of blocks sent. An erroneous block may be defined as a transport block, the cyclic redundancy check (CRC) of which is wrong.

Figure 1:
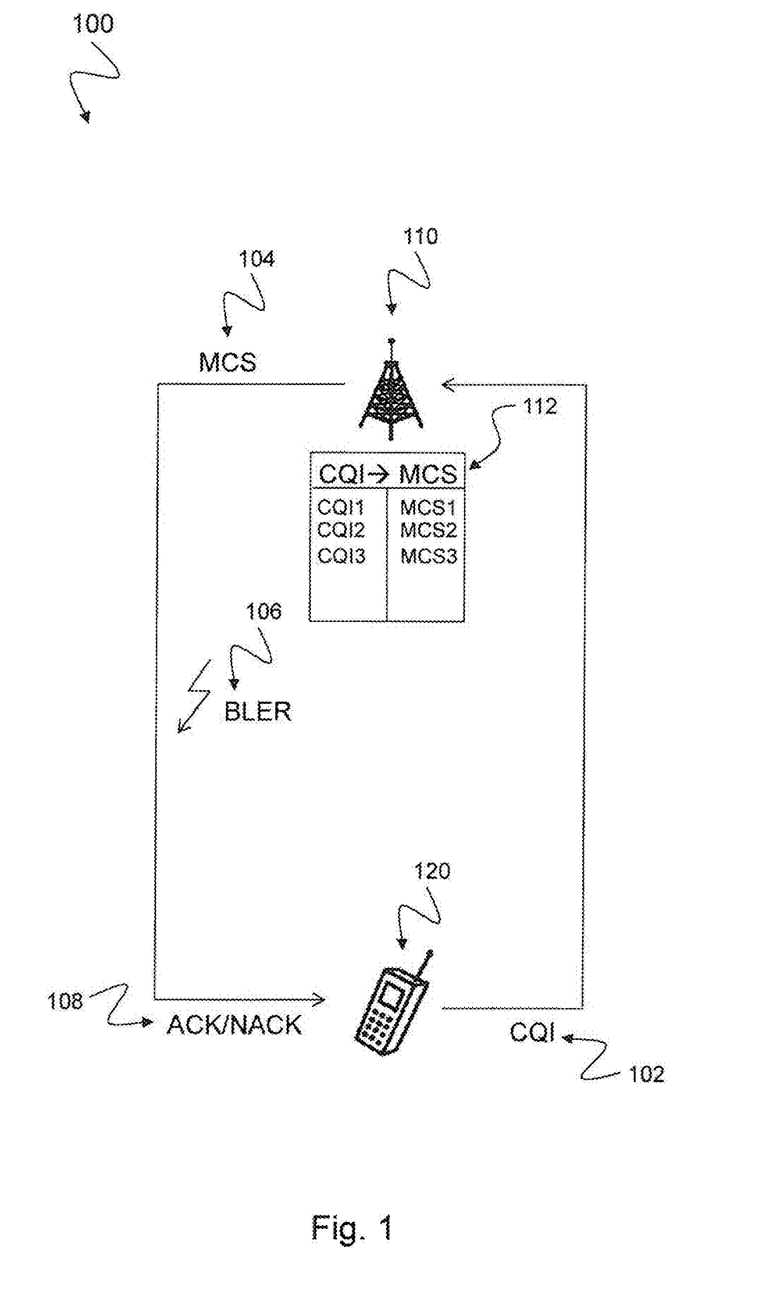
Figure 2:
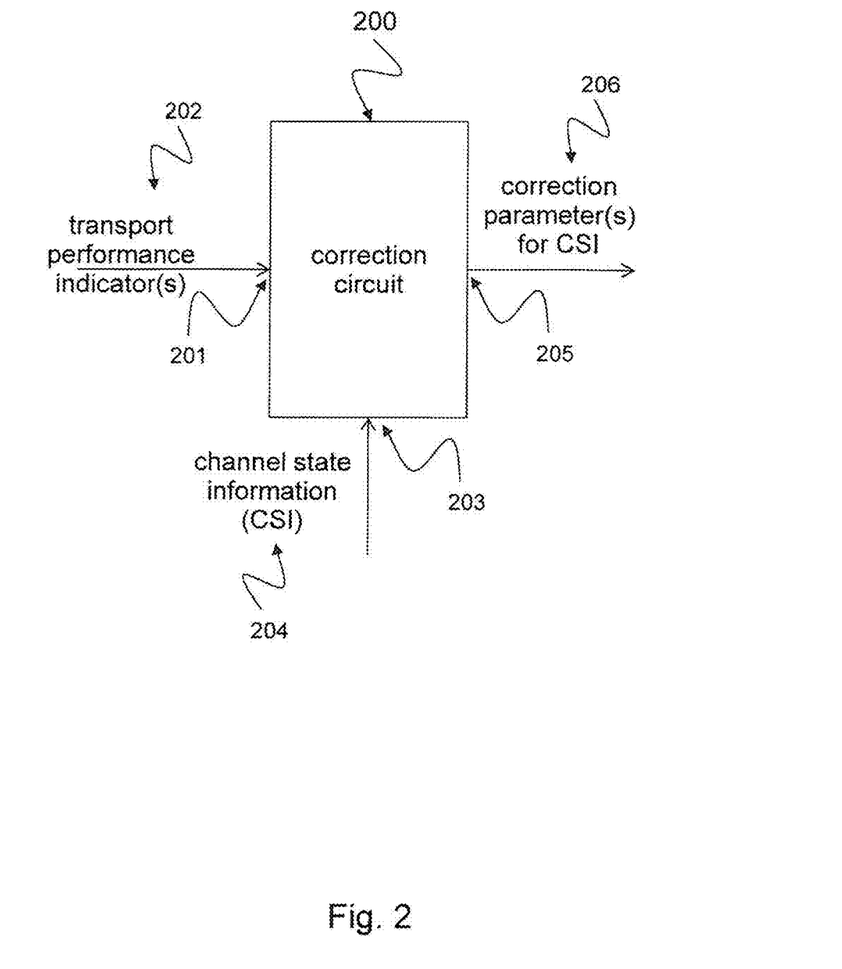

FIG. 2 is a block diagram of a correction circuit 200 for providing at least one correction parameter 206 for correcting channel state information in accordance with the disclosure.

The correction circuit 200 includes a first input 201 for receiving at least one transport performance indicator 202 indicating a transport performance of data received over a radio channel. The correction circuit 200 includes a second input 203 for receiving channel state information 204. The correction circuit 200 includes an output 205 for providing the at least one correction parameter 206 based on a relationship between the at least one transport performance indicator 202 and the channel state information 204.

The channel state information 204 may include a channel quality indicator, a rank indicator and a precoder matrix indicator as described below with respect to FIGS. 4 and 5. The at least one transport performance indicator 202 may include one or more of the following performance values: a number of transport blocks transmitted over the radio channel within a transmission time interval, a number of layers over which the transport blocks are transmitted, a received modulation coding scheme, an indicator indicating one of an acknowledgement and a non-acknowledgement per transport block, a new data indicator indicating a new data transmission of the transport block, a spectral efficiency per transport block. The channel state information may have been previously reported to a network and may have been used by the network for deriving a format of the data received over the radio channel.

The correction circuit 200 may include a synchronization detection circuit, a block error rate tracking circuit and a channel quality indicator tuning circuit as described below with respect to FIG. 5.

Figure 3:
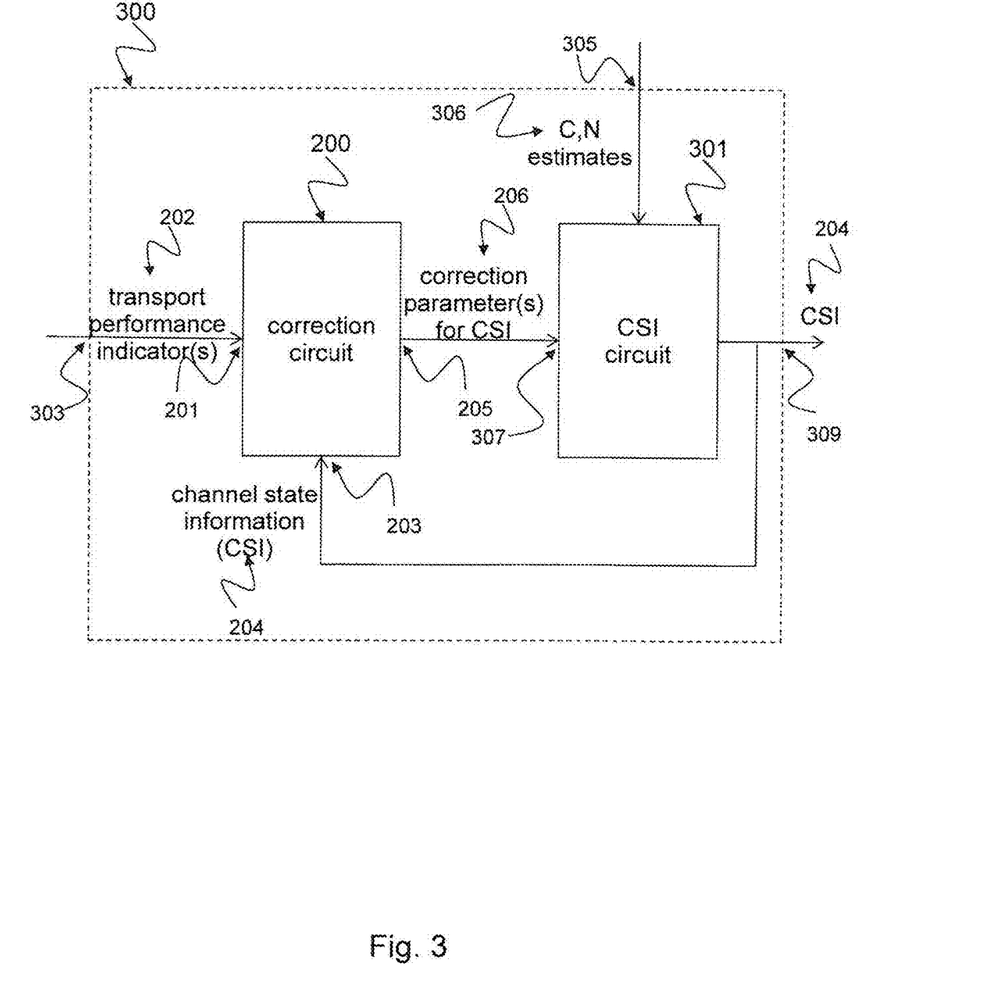

FIG. 3 is a block diagram of a device 300 for providing channel state information in accordance with the disclosure.

The device 300 includes a first input 303 for receiving at least one transport performance indicator 202 indicating a transport performance of the data received over the radio channel. The device 300 includes a second input 305 for receiving channel and noise plus interference observation 306 of data received over a radio channel. The device 300 includes an output 309 for providing channel state information 204. The device 300 includes a channel state information circuit 301 configured to provide the channel state information 204 based on the channel and noise plus interference observation 306 and based on at least one correction parameter 206. The channel state information may have been previously reported to a network and may have been used by the network for deriving a format of the data received over the radio channel. The device 300 includes a correction circuit 200, e.g. as described above with respect to FIG. 2 configured to provide the at least one correction parameter 206 based on a relationship between the at least one transport performance indicator 202 and the channel state information 204.

The at least one correction parameter 206 may include a correction for an estimated signal to interference plus noise ratio of the data received over the radio channel. The at least one correction parameter 206 may include a correction for an estimated mutual information of the radio channel. The at least one correction parameter 206 may include a correction parameter for thresholds applicable for determining a channel quality indicator of the radio channel. The at least one correction parameter 206 may include a correction parameter for entries of at least one lookup table determining a mapping of the mutual information versus the channel quality indicator of the radio channel. The at least one correction parameter 206 may include a correction parameter for a mapping of the estimated signal to interference plus noise ratio to a channel quality indicator.

Figure 4:
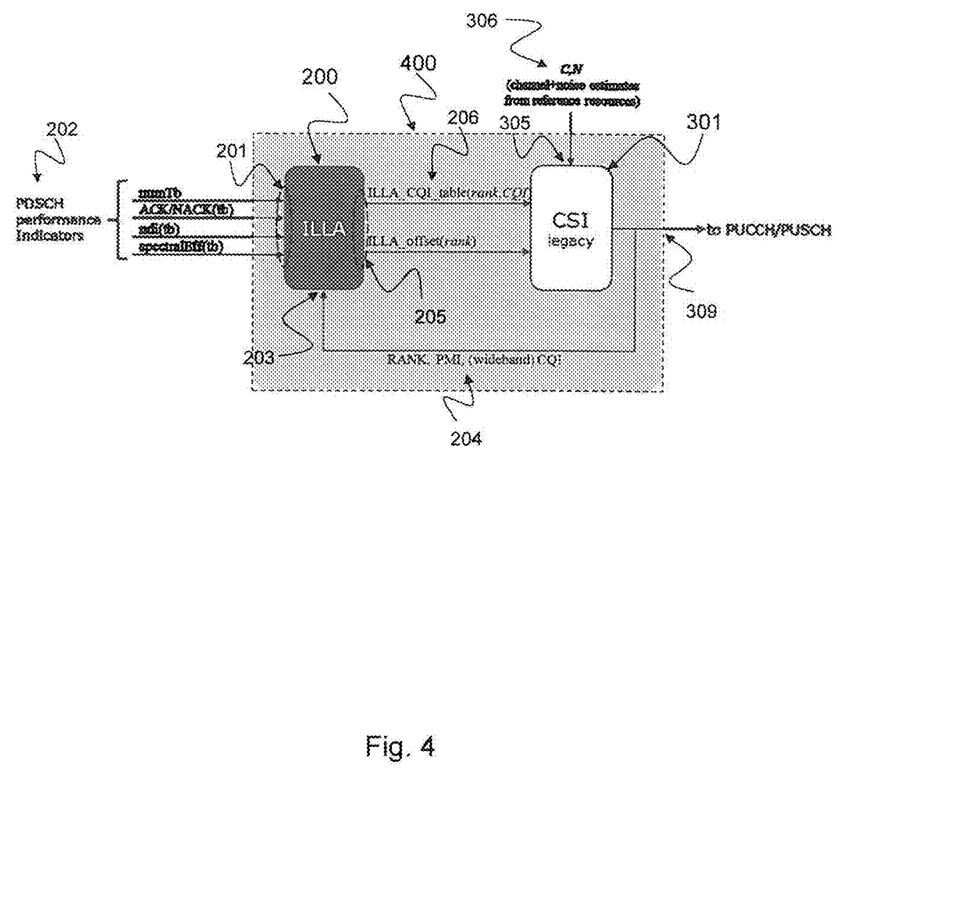

FIG. 4 is a block diagram of a device 400 for providing channel state information in accordance with the disclosure.

The device 400 includes a first input 201 for receiving at least one transport performance indicator 202 indicating a transport performance of the data received over the radio channel. The device 400 includes a second input 305 for receiving channel and noise plus interference observation 306 of data received over a radio channel. The device 400 includes an output 309 for providing channel state information 204. The device 400 includes a channel state information circuit 301 configured to provide the channel state information 204 based on the channel and noise plus interference observation 306 and based on at least one correction parameter 206. The channel state information 204 may have been previously reported to a network (not shown) and may have been used by the network for deriving a format of the data received over the radio channel. The device 400 includes a correction circuit 200, e.g. as described above with respect to FIGS. 2 and 3 configured to provide the at least one correction parameter 206 based on a relationship between the at least one transport performance indicator 202 and the channel state information 204.

The channel state information 204 may include at least one of a channel quality indicator (CQI), a rank indicator (RANK) and a precoder matrix indicator (PMI). The at least one transport performance indicator 202 may include at least one of the following performance values: a number of transport blocks transmitted over the radio channel, a number of layers over which the transport blocks are transmitted, a received modulation coding scheme, a spectral efficiency per transport block, an indicator indicating one of an acknowledgement ACK and a non-acknowledgement NACK per transport block (tb). The indicator may be based on one of the following: a cyclic redundancy check determined for the data received over the radio channel, a new data indicator indicating a new data transmission of the transport block.

The at least one correction parameter 206 may include an offset parameter ILLA_offset(rank) for the correction of the channel state information. The at least one correction parameter 206 may include a correction parameter for at least one channel quality indicator table ILLA_CQI_table (rank, CQI).

The block diagram of FIG. 4 shows a generic implementation of a device 400 for providing channel state information where the output of the ILLA algorithm may include: A correction (referred as ILLA_offset) that may be directly applied in the measured channel observation 306, e.g. the signal to noise ratio (SNR) or the mutual information; and a correction (referred as ILLA_CQI_table) that may be directly applied into the look-up-tables defining the signal to noise ratio/mutual information→CQI mapping. These outputs may be provided as input to the channel state information circuit 301 that may perform a CSI legacy circuit in charge of computing the CSI reporting.

The device 400 may combine the channel measurements 306 with the data channel error rate monitored using the ACK/NACK (equivalent to CRC pass/fail) at the output of the receiving chain. The device 400 may use an algorithm for providing inputs to a legacy CSI generation module, i.e. the channel state information circuit 301. The corrections computed by ILLA may be two-fold: i) A correction that may be applied directly in the metric being computed in equations (1)-(3), for instance by adjusting the level of β. The output of this method is referred as ILLA_offset; ii) A correction that is applied directly into the CQI(i) tables. The output of this method is referred as ILLA_CQI_tables.

CSI reporting as performed by the channel state information circuit 301 may include algorithms that are based on channel and noise plus interference measurements from which a CSI may be derived.

An example of such an algorithm is described in the following. In a first block, the channel estimates may be normalized by the noise estimates, e.g. according to $$H_n = H(k) \times \frac{1}{N(k)},$$

where k is the resource index; in a second block, the post-equalization SNR may be estimated, e.g. according to $$\rho(k) = \gamma(H_n(k)),$$

and in a third block, the channel capacity or the mutual information may be derived based on the estimated post-equalization SNR and adjusted by a SNR shift β, e.g. according to $$I(k,l) = f\beta \times \rho(k, l),$$

with k≡resource index and l≡layer index.

The k resources may be obtained for a certain bandwidth and during a certain time interval. These resources may then be combined into a single metric which may then be compared against pre-computed thresholds that allow determining the highest rate that can be achieved by each layer and for a certain error rate, e.g. according to $$\max_i \left( \frac{\Sigma_k I(k, l)}{N} > CQI(i) \right), \quad (4)$$

This highest rate may be reported back to the network as the Channel Quality Indicator (CQI). The pre-computed thresholds CQI(i) are referred as CQI tables in this disclosure.

In case of ILLA_offset computation, ILLA can use either directly the ACK/NACK to compute the ILLA_offset for each rank, Δ(rank), as follows,

```
(1)     for j = 1:numTb
            if ACK(j),
                Δ(numTb) = Δ(numTb) + A_up
            else
                Δ(numTb) = Δ(numTb) − A_down
            end
        end
``` where $A_{up}$ and $A_{down}$ define the convergence rate of the ILLA algorithm as well as the target BLER:

$$BLER = \left(1 + \frac{A_{down}}{A_{up}}\right)^{-1}$$

Or the correction may be based on the observed BLER:

```
(2)     for j = 1:numTb
            if BLER > BLER_target,
                Δ(numTb) = Δ(numTb) + A_up
            else
                Δ(numTb) = Δ(numTb) − A_down
            end
        end
```

In the second case where the correction is based on the observed BLER, ILLA is free to choose $A_{up}$ and $A_{down}$ independently of the target BLER. This flexibility allows then to decide whether ILLA takes a conservative approach, e.g. setting an $A_{down} \gg A_{up}$ to recover faster from outage situations, or a more aggressive one $A_{down} \approx A_{up}$ where ILLA corrections are faster in both directions making BLER to oscillate more around the target BLER.

For the ILLA_CQI calculation, BLER may be required per CQI, based on this, the correction applied to the default value in the CQI tables for CQI index i, δ(i, rank), may be computed as follows:

(3)  for j = 1:numTb
        if BLER(i) > BLER$_{target}$,
            δ(k,numTb) = δ(i,numTb) + A$_{up}$,         k = i
        else
            δ(k,numTb) = δ(k,numTb) − A$_{down}$,       k = i + 1
        end
     end The correction may be applied to one or more cqi indices k based on the value of BLER measured and based on the data channel with modulation and coding rates matching the spectral efficiency of the cqi index i.

These two corrections can be computed and applied simultaneously or at different instants (e.g. in a time-shared manner). Both metrics have different characteristics and are complementary to each other, i.e., ILLA_offset provides a faster convergence and wider correction capabilities, while ILLA_CQI provides a fine-grain resolution.

The device 400 may perform processing based on the ACK/NACK measured by the UE on a particular channel (i.e. PDSCH) for which the UE is expected to report CSI. The UE may use the ACK/NACK measured in the same channel to derive corrections such that the error rate doesn't exceed a target rate. The corrections may be applied during the calculation of the CSI. The reported CSI may be used for deriving the modulation and coding rate of the data channel.

These corrections are similar to the link adaptation algorithms where an entity external to the UE is monitoring the error rate of the data channel which error rate is used by the eNB to perform link adaptation (also referred to as Outer Loop Link Adaptation. When using the device 400 or generally devices and methods according to the disclosure such external entity is not required because devices and methods according to the disclosure are able to replicate the link adaptation internally to the UE. This replication technique or algorithm inside the UE is also referred to as "Inner Loop Link Adaptation (ILLA)".

Figure 5:
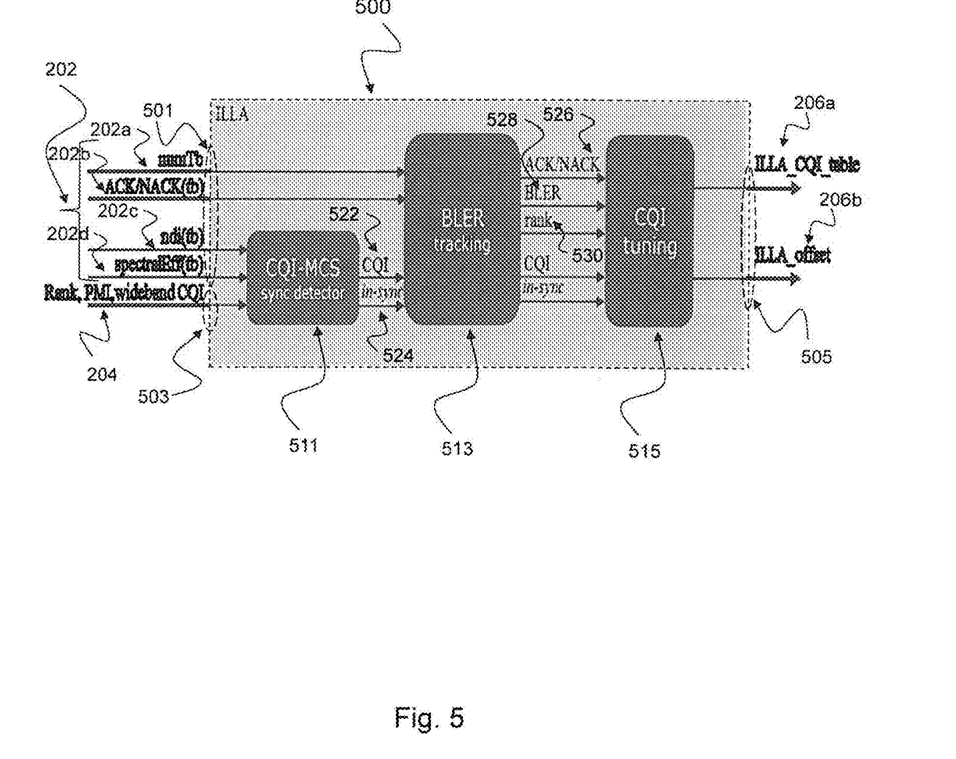

FIG. 5 is a block diagram of a correction circuit 500 for providing at least one correction parameter 206a, 206b for correcting channel state information in accordance with the disclosure. The device 500 is also referred to as ILLA device hereinafter.

FIG. 5 illustrates a possible implementation of the inner loop link adaptation concept according to the disclosure. In the implementation illustrated in FIG. 5, the correction circuit 500 may be divided into 3 sub-circuits or sub-tasks which are a CQI-MCS Sync Detector 511, a BLER tracking module 513 and a CQI tuning module 515 as described in the following. The CQI-MCS Sync Detector 511 may be used to guarantee that the DL (downlink) scheduler follows reported CQI for new data transmissions and that eNB is using the reported CQI. The BLER tracking module 513 may computes BLER per CQI index and independently for each rank. This module 513 may only be active when CQI-MCS are in-sync. The CQI tuning module 515 may compute the ILLA_offset 206b and the ILLA_CQI tables 206a as described above with respect to FIG. 4 depending on ACK/NACK 526 and/or BLER 528. In addition, for the ILLA_CQI table calculation, it may takes care that the resulting CQI table is monotonically increasing (i.e CQI (i)<CQI (j) if i<j).

The correction circuit 500 includes a first input 501 for receiving at least one transport performance indicator 202, e.g. a number of transport blocks 202a transmitted over the radio channel within a transmission time interval, an indicator 202b indicating one of an acknowledgement and a non-acknowledgement per transport block, a new data indicator (ndi) 202c indicating a new data transmission of the transport block, a spectral efficiency 202d per transport block. The transport performance indicators 202 are indicating a transport performance of data received over a radio channel, e.g. as described above with respect to FIGS. 2 to 4. The new data transmission indicated by the new data indicator (ndi) 202c may be a first transmission with respect to a hybrid automatic repeat request (HARQ) scheme. The correction circuit 500 includes a second input 503 for receiving channel state information 204. The channel state information may have been previously reported to a network and may have been used by the network for deriving a format of the data received over the radio channel. The correction circuit 500 includes an output 505 for providing the at least one correction parameter 206a, 206b based on a relationship between the at least one transport performance indicator 202 and the channel state information 204.

The channel state information 204 may include a channel quality indicator (CQI), a rank indicator (RI or RANK) and a precoder matrix indicator (PMI).

The correction circuit 500 may include a synchronization detection circuit 511 that may be configured to indicate a synchronization state 524 in which a format of the data received over the radio channel matches to a previously reported channel state information. The synchronization detection circuit 511 may be configured to indicate the synchronization state 524 based on the channel state information 204 and based on at least one of the following transport performance indicators: a new data indicator 202c indicating a new data transmission of a transport block transmitted over the radio channel, a number of received transport blocks and/or layers. The synchronization detection circuit 511 may be configured to evaluate multiple channel state information previously reported during a certain time window.

The synchronization detection circuit 511 may provide the channel quality indicator 522 as included in the channel state information 204.

The correction circuit 500 may include a block error rate tracking circuit 513 that maybe configured to determine a block error rate based on the at least one transport performance indicator. The block error rate may be determined based on a channel quality information index or alternatively based on the entire transport block independently of the channel quality information index. The block error rate tracking circuit 513 may be configured to determine the block error rate if the synchronization detection circuit indicates a synchronization state.

The correction circuit 500 may include a channel quality indicator tuning circuit 515 that may be configured to determine the at least one correction parameter 206a, 206b based on at least one of the following: the block error rate BLER 528, an indicator 526 indicating one of an acknowledgement and a non-acknowledgement per transport block. The at least one correction parameter may be provided based on the synchronization state, such that the at least one correction parameter is modified in the synchronization state and not modified out of the synchronization state. The channel quality indicator tuning circuit 515 may be configured to provide monotonically increasing channel quality information tables(ILLA_CQI_table) 206a. The channel quality indicator tuning circuit 515 may be configured to determine an offset parameter for the correction of the channel state information (ILLA_offset) based on the indicator 526 indicating one of an acknowledgement and a non-acknowledgement per transport block.

The channel quality indicator tuning circuit 515 may be configured to increase the offset parameter (ILLA_offset) 206b if the indicator 526 indicates an acknowledgement and to decrease the offset parameter (ILLA_offset) 206b if the indicator 526 indicates a non-acknowledgement. The channel quality indicator tuning circuit 515 may be configured to determine an offset parameter based on the block error rate BLER 528. The channel quality indicator tuning circuit 515 may be configured to increase the offset parameter (ILLA_offset) 206b if the block error rate BLER 528 exceeds a threshold and to decrease the offset parameter (ILLA_offset) 206b if the block error rate BLER 528 falls below the threshold, e.g. as described above with respect to FIG. 4. The channel quality indicator tuning circuit 515 may be configured to determine a correction parameter for at least one entry in a channel quality indicator table ILLA_CQI_table 206a based on the block error rate, e.g. as described above with respect to FIG. 4. The channel quality indicator table ILLA_CQI_table 206a may include individually changeable entries. The channel quality indicator tuning circuit 515 may be configured to increase the correction parameter if the block error rate BLER 528 exceeds a threshold and to decrease the correction parameter if the block error rate BLER 528 falls below the threshold, e.g. as described above with respect to FIG. 4.

In one example, the corrections computed by the ILLA device 500 are only carried out when the following conditions are met: a) Data has been received and ACK/NACK are available; b) The data received corresponds to a new data transmission (as CQI is reported for initial transmission); c) The spectral efficiency of the data channel matches one of the latest reported CQI in a given time interval (i.e. data channel modulation and coding scheme is in-sync with the reported CQI); and d) The rank of the data channel matches the rank reported in the given interval.

The matching according to condition c) may be performed by considering each CQI(i) that corresponds to a range of spectral efficiencies (spectralEff) according to:

$$CQI_{se_{low(i)}} < \text{spectralEff} < CQI_{se_{high(i)}}$$

In one possible implementation, the following relation holds:

$$CQI_{se_{high}(i)} = CQI_{se_{low}(j)} = \frac{CQI_{se(i)} + CQI_{se(j)}}{2},$$

with $j = i + 1$

In the device 500 the conditions b) to d) may be checked inside the CQI-MCS Sync detector 511.

Figure 6:
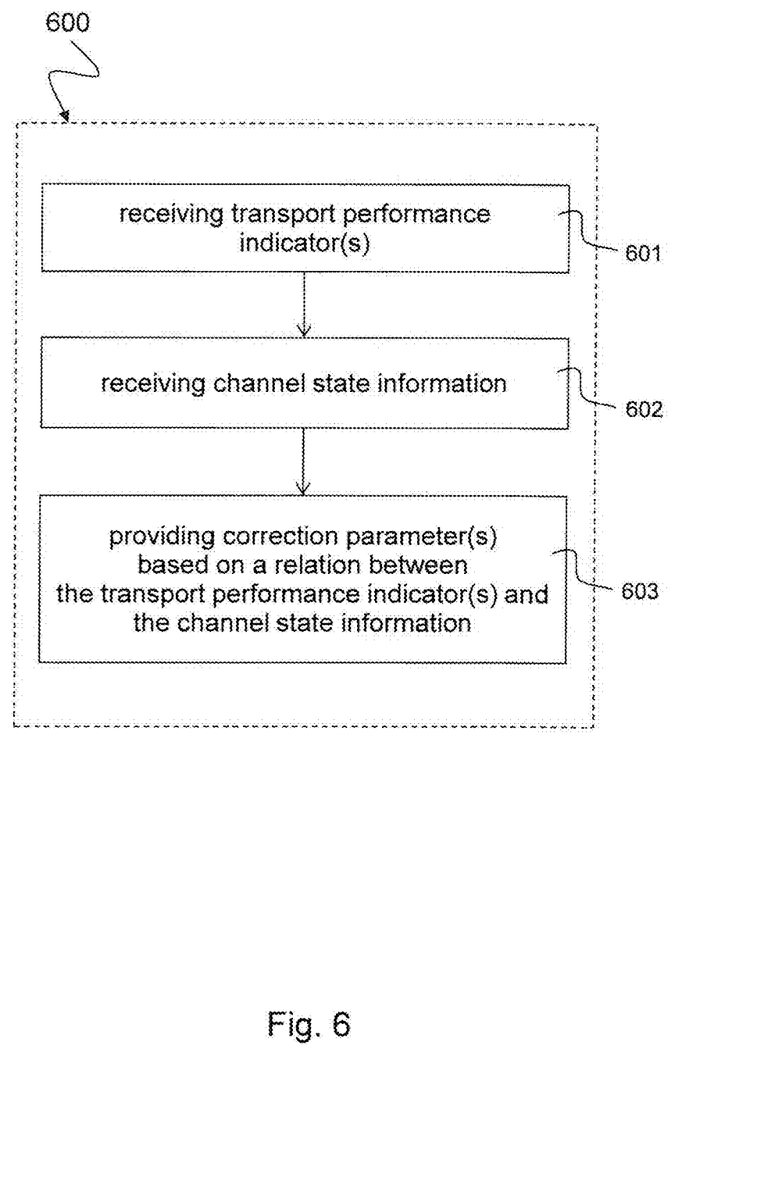

FIG. 6 is a schematic diagram of a method 600 for providing at least one correction parameter for determining channel state information in accordance with the disclosure.

The method 600 includes receiving 601 at least one transport performance indicator indicating a performance of data received over a radio channel, e.g. as described above with respect to FIGS. 2 to 5. The method 600 includes receiving 602 channel state information, e.g. as described above with respect to FIGS. 2 to 5. The method 600 includes providing 603 the at least one correction parameter based on a relationship between the at least one transport performance indicator and the channel state information, e.g. as described above with respect to FIGS. 2 to 5. The channel state information may have been previously reported to a network and may have been used by the network for deriving a format of the data received over the radio channel.

The method 600 may further include determining corrected channel state information based on the previously reported channel state information and the at least one correction parameter. The method 600 may further include: determining the correction parameter based on at least one of the following performance values: a number of transport blocks transmitted over the radio channel, a number of layers over which the transport blocks are transmitted, a received modulation coding scheme, a spectral efficiency per transport block, an indicator indicating one of an acknowledgement and a non-acknowledgement per transport block, the indicator based on one of the following: a cyclic redundancy check determined for the data received over the radio channel, a new data indicator indicating a new data transmission of the transport block.

The present disclosure also supports a computer program product including computer executable code or computer executable instructions that, when executed, causes at least one computer to execute the performing and computing steps described herein, in particular the method 600 as described above with respect to FIG. 6 and the techniques described above with respect to FIGS. 2 to 5. Such a computer program product may include a readable storage medium storing program code thereon for use by a computer. The program code may perform the method 600 as described above with respect FIG. 6.

Figure 7:
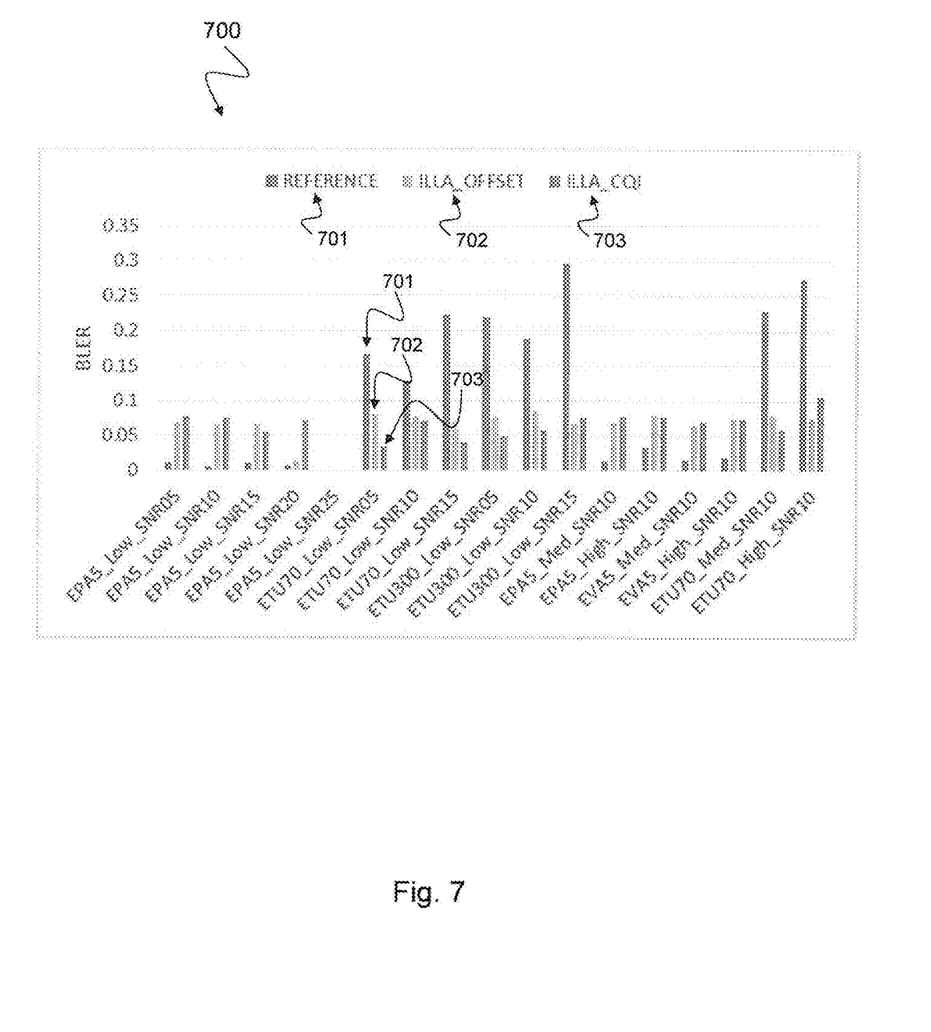

FIG. 7 is a performance diagram 700 illustrating the block error rate of a device according to the disclosure for different exemplary channels. For each exemplary channel a serving cell reference symbol measurement 701, an ILLA_OFFSET measurement 702 and an ILLA_CQI measurement 703 is depicted.

The results shown in FIG. 7 are obtained for a link level simulation of a single cell LTE downlink with 10 MHz bandwidth, where eNB adapts the downlink modulation and coding scheme (MCS) following the reported CQI. Transmission mode used is 2 with 2 TX antennas and all dedicated downlink resources are assigned to the UE. The results show that when ILLA is enabled, BLER is below the target BLER of 10 percent for all scenarios. ILLA also provides high gains in case of interference scenarios by sensing the interference level through the BLER of the data channel.

Methods and devices according to the disclosure provide a mechanism to adjust the reported channel state information (CSI) using the error rate measurements for the channel that is being reported (e.g. PDSCH in LTE system). The CSI may include channel quality indicator (CQI), rank and precoder matrix indicator (PMI).

A main benefit of devices and methods according to the disclosure is that the CSI is then sensitive to effects not visible in the reference symbols embedded into the downlink stream, e.g. Cell Specific Reference Symbols, CRS, or Channel state information reference symbols, CSI-RS. Examples for such scenarios are non-colliding interference scenarios (interferer CRS don't collide with those from serving cell and interferer is not fully loaded) and colliding interference with different power in carriers used for reference symbols as compared to data carriers. In the past, this issue has been addressed by providing additional information from adjacent cells and incorporating that as a bound on the reported CQI. A second significant advantage of devices and methods according to the disclosure is that CQI tables calibration may be performed in real time (on-the-fly), and therefore offline calibration process are of less importance. This saves lots of efforts as so far every performance improvement in the data path should be matched with an equivalent improvement in the reported CQI which required lots of offline calculations that need to be incorporated into the internal LUT (lookup table), in some cases requiring detecting the scenario and then applying the LUT for that scenario. The old scheme also had higher memory requirements as every scenario had to be stored with a dedicated LUT.

EXAMPLES

The following examples pertain to further embodiments. Example 1 is a correction circuit for providing at least one correction parameter for correcting channel state information, the correction circuit comprising: a first input for receiving at least one transport performance indicator indicating a transport performance of data received over a radio channel; a second input for receiving channel state information; and an output for providing the at least one correction parameter based on a relationship between the at least one transport performance indicator and the channel state information.

In Example 2, the subject matter of Example 1 can optionally include that the channel state information was previously reported to a network and used by the network for deriving a format of the data received over the radio channel.

In Example 3, the subject matter of any one of Examples 1-2 can optionally include that the channel state information comprises a channel quality indicator, a rank and a precoder matrix indicator.

In Example 4, the subject matter of any one of Examples 1-3 can optionally include that the at least one transport performance indicator comprises at least one of the following performance values: a number of transport blocks transmitted over the radio channel, a number of layers over which the transport blocks are transmitted, a received modulation coding scheme, a spectral efficiency per transport block, an indicator indicating one of an acknowledgement and a non-acknowledgement per transport block, the indicator based on one of the following: a cyclic redundancy check determined for the data received over the radio channel, a new data indicator indicating a new data transmission of the transport block.

In Example 5, the subject matter of any one of Examples 1-4 can optionally include a synchronization detection circuit configured to indicate a synchronization state in which a format of the data received over the radio channel matches to a previously reported channel state information.

In Example 6, the subject matter of Example 5 can optionally include that the synchronization detection circuit is configured to indicate the synchronization state based on the channel state information and based on at least one of the following transport performance indicators: a new data indicator indicating a new data transmission of a transport block transmitted over the radio channel, a number of received transport blocks and/or layers.

In Example 7, the subject matter of any one of Examples 5-6 can optionally include that the synchronization detection circuit is configured to evaluate multiple channel state information previously reported during a certain time window.

In Example 8, the subject matter of any one of Examples 5-7 can optionally include a block error rate tracking circuit configured to determine a block error rate based on the at least one transport performance indicator.

In Example 9, the subject matter of Example 8 can optionally include that the block error rate is determined based on one of the following: a channel quality information index, the entire transport block independently of the channel quality information index.

In Example 10, the subject matter of any one of Examples 8-9 can optionally include that the block error rate tracking circuit is configured to determine the block error rate if the synchronization detection circuit indicates a synchronization state.

In Example 11, the subject matter of any one of Examples 8-10 can optionally include a channel quality indicator tuning circuit configured to determine the at least one correction parameter based on at least one of the following: the block error rate, an indicator indicating one of an acknowledgement and a non-acknowledgement per transport block.

In Example 12, the subject matter of any one of Examples 5-11 can optionally include that the at least one correction parameter is provided based on the synchronization state, such that the at least one correction parameter is modified in the synchronization state and not modified out of the synchronization state.

In Example 13, the subject matter of any one of Examples 11-12 can optionally include that the channel quality indicator tuning circuit is configured to provide monotonically increasing channel quality information tables.

In Example 14, the subject matter of any one of Examples 11-13 can optionally include that the channel quality indicator tuning circuit is configured to determine an offset parameter for the correction of the channel state information based on the indicator indicating one of an acknowledgement and a non-acknowledgement per transport block.

In Example 15, the subject matter of Example 14 can optionally include that the channel quality indicator tuning circuit is configured to increase the offset parameter if the indicator indicates an acknowledgement and to decrease the offset parameter if the indicator indicates a non-acknowledgement.

In Example 16, the subject matter of any one of Examples 11-15 can optionally include that the channel quality indicator tuning circuit is configured to determine an offset parameter based on the block error rate.

In Example 17, the subject matter of Example 16 can optionally include that the channel quality indicator tuning circuit is configured to increase the offset parameter if the block error rate exceeds a threshold and to decrease the offset parameter if the block error rate falls below the threshold.

In Example 18, the subject matter of any one of Examples 11-17 can optionally include that the channel quality indicator tuning circuit is configured to determine a correction parameter for at least one entry in a channel quality indicator table based on the block error rate, and that the channel quality indicator table comprises individually changeable entries.

In Example 19, the subject matter of Example 18 can optionally include that the channel quality indicator tuning circuit is configured to increase the correction parameter if the block error rate exceeds a threshold and to decrease the correction parameter if the block error rate falls below the threshold.

Example 20 is a device for providing channel state information, the device comprising: a first input for receiving at least one transport performance indicator indicating a transport performance of the data received over the radio channel; a second input for receiving channel and noise plus interference observation of data received over a radio channel; an output for providing channel state information; a channel state information circuit configured to provide the channel state information based on the channel and noise plus interference observation and based on at least one correction parameter; and a correction circuit configured to provide the at least one correction parameter based on a relationship between the at least one transport performance indicator and the channel state information.

In Example 21, the subject matter of Example 20 can optionally include that the channel state information was previously reported to a network and used by the network for deriving a format of the data received over the radio channel.

In Example 22, the subject matter of any one of Examples 20-21 can optionally include that the at least one correction parameter comprises a correction for at least one of the following parameters: an estimated signal to interference plus noise ratio of the data received over the radio channel, an estimated mutual information of the radio channel, thresholds applicable for determining a channel quality indicator of the radio channel, entries of at least one lookup table determining a mapping of the mutual information versus the channel quality indicator of the radio channel, a mapping of the estimated signal to interference plus noise ratio to a channel quality indicator.

Example 23 is a method for providing at least one correction parameter for determining channel state information, the method comprising: receiving at least one transport performance indicator indicating a performance of data received over a radio channel; receiving channel state information; providing the at least one correction parameter based on a relationship between the at least one transport performance indicator and the channel state information.

In Example 24, the subject matter of Example 23 can optionally include that the channel state information was previously reported to a network and used by the network for deriving a format of the data received over the radio channel.

In Example 25, the subject matter of Example 24 can optionally include determining corrected channel state information based on the previously reported channel state information and the at least one correction parameter.

Example 26 is a computer readable medium on which computer instructions are stored which when executed by a computer, cause the computer to perform the method of one of Examples 23 to 25.

Example 27 is a system for providing channel state information, the system comprising: a first input for receiving at least one transport performance indicator indicating a transport performance of the data received over the radio channel; a second input for receiving channel and noise plus interference observation of data received over a radio channel; an output for providing channel state information; a channel state information circuit configured to provide the channel state information based on the channel and noise plus interference observation and based on at least one correction parameter; and a correction circuit configured to provide the at least one correction parameter based on a relationship between the at least one transport performance indicator and the channel state information.

In Example 28, the subject matter of Example 27 can optionally include a network to which the channel state information was previously reported and used by the network for deriving a format of the data received over the radio channel.

In Example 29, the subject matter of any one of Examples 27-28 can optionally include that the at least one correction parameter comprises a correction for at least one of the following parameters: an estimated signal to interference plus noise ratio of the data received over the radio channel, an estimated mutual information of the radio channel, thresholds applicable for determining a channel quality indicator of the radio channel, entries of at least one lookup table determining a mapping of the mutual information versus the channel quality indicator of the radio channel, a mapping of the estimated signal to interference plus noise ratio to a channel quality indicator.

In Example 30, the subject matter of any one of Examples 27-29 can optionally include that the system is an on-chip system.

Example 31 is a device for providing at least one correction parameter for determining channel state information, the device comprising: means for receiving at least one transport performance indicator indicating a performance of data received over a radio channel; means for receiving channel state information; and means for providing the at least one correction parameter based on a relationship between the at least one transport performance indicator and the channel state information.

In Example 32, the subject matter of Example 31 can optionally include that the channel state information was previously reported to a network and used by the network for deriving a format of the data received over the radio channel.

In Example 33, the subject matter of Example 23 can optionally include determining corrected channel state information based on the previously reported channel state information and the at least one correction parameter.

In Example 34, the subject matter of any one of Examples 23-24 can optionally include that the channel state information comprises a channel quality indicator, a rank and a precoder matrix indicator.

In Example 35, the subject matter of any one of Examples 23-24 can optionally include that the at least one transport performance indicator comprises at least one of the following performance values: a number of transport blocks transmitted over the radio channel, a number of layers over which the transport blocks are transmitted, a received modulation coding scheme, a spectral efficiency per transport block, an indicator indicating one of an acknowledgement and a non-acknowledgement per transport block, the indicator based on one of the following: a cyclic redundancy check determined for the data received over the radio channel, a new data indicator indicating a new data transmission of the transport block.

In Example 36, the subject matter of any one of Examples 23-24 can optionally include indicating a synchronization state in which a format of the data received over the radio channel matches to a previously reported channel state information.

In Example 37, the subject matter of Example 36 can optionally include indicating the synchronization state based on the channel state information and based on at least one of the following transport performance indicators: a new data indicator indicating a new data transmission of a transport block transmitted over the radio channel, a number of received transport blocks and/or layers.

In Example 38, the subject matter of any one of Examples 36-37 can optionally include evaluating multiple channel state information previously reported during a certain time window.

In Example 39, the subject matter of any one of Examples 36-38 can optionally include determining a block error rate based on the at least one transport performance indicator.

In Example 40, the subject matter of Example 39 can optionally include determining the block error rate based on one of the following: a channel quality information index, the entire transport block independently of the channel quality information index.

In Example 41, the subject matter of any one of Examples 39-40 can optionally include determining the block error rate if a synchronization state is indicated.

In Example 42, the subject matter of any one of Examples 39-41 can optionally include determining the at least one correction parameter based on at least one of the following: the block error rate, an indicator indicating one of an acknowledgement and a non-acknowledgement per transport block.

In Example 43, the subject matter of any one of Examples 36-42 can optionally include providing the at least one correction parameter based on the synchronization state, such that the at least one correction parameter is modified in the synchronization state and not modified out of the synchronization state.

In Example 44, the subject matter of any one of Examples 42-43 can optionally include providing monotonically increasing channel quality information tables.

In Example 45, the subject matter of any one of Examples 42-44 can optionally include determining an offset parameter for the correction of the channel state information based on the indicator indicating one of an acknowledgement and a non-acknowledgement per transport block.

In Example 46, the subject matter of Example 45 can optionally include increasing the offset parameter if the indicator indicates an acknowledgement and decreasing the offset parameter if the indicator indicates a non-acknowledgement.

In Example 47, the subject matter of any one of Examples 42-46 can optionally include determining an offset parameter based on the block error rate.

In Example 48, the subject matter of Example 47 can optionally include increasing the offset parameter if the block error rate exceeds a threshold and decreasing the offset parameter if the block error rate falls below the threshold.

In Example 49, the subject matter of any one of Examples 42-48 can optionally include determining a correction parameter for at least one entry in a channel quality indicator table based on the block error rate, wherein the channel quality indicator table comprises individually changeable entries.

In Example 50, the subject matter of Example 49 can optionally include increasing the correction parameter if the block error rate exceeds a threshold and decreasing the correction parameter if the block error rate falls below the threshold.

Methods and devices according to the disclosure are based on the concept to combine both worlds of channel measurement and Link Adaptation algorithms directly in the UE. This has the following benefits: UE has access to full channel measurements and ACK/NACKs, being able to provide correction in more specific ranges (e.g. frequency domain, SNR range, rank, etc.). As channel measurements and error rate measurements are both done in the UE, there is no latency between error rate measurements and when the next CSI is reported, allowing faster convergence of the error rate to the desired target. In a cellular network, in case UE is being handed from one cell to another cell, corrections obtained by ILLA can be reused from one cell to the other assuming interference conditions are similar in both cells. This applies in scenarios where there are multiple interferers where a handover to a new cell does not change the interference level drastically. This improves the performance of the data path during mobility conditions. In case of high Doppler, UE is able to compensate the latency between the instant when CSI is generated to the instant when CSI is used in the downlink. Performance of the data path is consistent across different scenarios and testing condition as it doesn't rely on an OLLA.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

The invention claimed is:

1. A correction circuit for providing at least one correction parameter for correction of channel state information, the correction circuit comprising:
    a first input for receiving at least one transport performance indicator indicating a transport performance of data received over a radio channel;
    a second input for receiving channel state information that has been previously reported to a network and used by the network for deriving a format of the data received over the radio channel; and
    an output for providing the at least one correction parameter based on a relation between the at least one transport performance indicator and the channel state information,
    wherein, when the format of the data received over the radio channel data matches the previously reported channel state information, the at least one correction parameter and the previously reported channel state information are utilized to determine corrected channel state information, and
    wherein the at least one correction parameter and the previously reported channel state information are utilized to determine corrected channel state information when (i) ACK/NACK are available, (ii) the data received over the radio channel corresponds to a new data transmission, (iii) a spectral efficiency of the radio channel matches one of the latest reported CQI in a given time interval, and (iv) a rank of the radio channel matches a rank reported in the given time interval.

2. The correction circuit of claim 1,
wherein the previously reported channel state information comprises a channel quality indicator, a rank and a precoder matrix indicator.

3. The correction circuit of claim 1, wherein the at least one transport performance indicator comprises at least one of the following performance values:
a number of transport blocks transmitted over the radio channel,
a number of layers over which the transport blocks are transmitted,
a received modulation coding scheme,
a spectral efficiency per transport block,
an indicator indicating one of an acknowledgement and a non-acknowledgement per transport block, the indicator based on one of the following:
a cyclic redundancy check determined for the data received over the radio channel,
a new data indicator indicating a new data transmission of the transport block.

4. The correction circuit of claim 1, comprising:
a synchronization detection circuit configured to indicate a synchronization state when the format of the data received over the radio channel matches the previously reported channel state information.

5. The correction circuit of claim 4,
wherein the synchronization detection circuit is configured to indicate the synchronization state based on the previously reported channel state information and based on at least one of the following transport performance indicators:
a new data indicator indicating a new data transmission of a transport block transmitted over the radio channel,
a number of received transport blocks and layers.

6. The correction circuit of claim 4,
wherein the synchronization detection circuit is configured to evaluate multiple channel state information previously reported during a certain time window.

7. The correction circuit of claim 4, comprising:
a block error rate tracking circuit configured to determine a block error rate based on the at least one transport performance indicator.

8. The correction circuit of claim 7,
wherein the block error rate is determined based on one of the following:
a channel quality information index,
the entire transport block independently of the channel quality information index.

9. The correction circuit of claim 7,
wherein the block error rate tracking circuit is configured to determine the block error rate if the synchronization detection circuit indicates a synchronization state.

10. The correction circuit of claim 7, comprising:
a channel quality indicator tuning circuit configured to determine the at least one correction parameter based on at least one of the following:
the block error rate,
an indicator indicating one of an acknowledgement and a non-acknowledgement per transport block.

11. The correction circuit of claim 4,
wherein the at least one correction parameter is provided based on the synchronization state, such that the at least one correction parameter is modified in the synchronization state and not modified out of the synchronization state.

12. The correction circuit of claim 10,
wherein the channel quality indicator tuning circuit is configured to provide monotonically increasing channel quality information tables.

13. The correction circuit of claim 10,
wherein the channel quality indicator tuning circuit is configured to determine an offset parameter for correction of the previously reported channel state information based on the indicator indicating one of an acknowledgement and a non-acknowledgement per transport block.

14. The correction circuit of claim 13,
wherein the channel quality indicator tuning circuit is configured to increase the offset parameter if the indicator indicates an acknowledgement and to decrease the offset parameter if the indicator indicates a non-acknowledgement.

15. The correction circuit of claim 10,
wherein the channel quality indicator tuning circuit is configured to determine an offset parameter based on the block error rate.

16. The correction circuit of claim 15,
wherein the channel quality indicator tuning circuit is configured to increase the offset parameter if the block error rate exceeds a threshold and to decrease the offset parameter if the block error rate falls below the threshold.

17. The correction circuit of claim 10,
wherein the channel quality indicator tuning circuit is configured to determine a correction parameter for at least one entry in a channel quality indicator table based on the block error rate,
wherein the channel quality indicator table comprises individually changeable entries.

18. The correction circuit of claim 17,
wherein the channel quality indicator tuning circuit is configured to increase the correction parameter if the block error rate exceeds a threshold and to decrease the correction parameter if the block error rate falls below the threshold.

19. The correction circuit of claim 1, wherein the at least one correction parameter includes an offset parameter to adjust a level of signal-to-noise ratio (SNR) shift used to determine the channel state information, and a channel quality indicator (CQI) table correction parameter to adjust entries of at least one lookup table determining a mapping of the mutual information versus the channel quality indicator of the radio channel.

20. The correction circuit of claim 19, wherein the at least one lookup table includes pre-computed thresholds that indicate a highest rate that can be achieved by each of a plurality of transmission layers at a predetermined error rate.

21. A device for providing channel state information, the device comprising:
a first input for receiving at least one transport performance indicator indicating a transport performance of the data received over the radio channel;
a second input for receiving channel and noise plus interference observation of data received over a radio channel;
an output for providing channel state information;
a channel state information circuit configured to provide the channel state information based on the channel and noise plus interference observation and based on at least one correction parameter; and
a correction circuit configured to, when a format of the data received over the radio channel data matches the channel state information previously reported by a network, provide the at least one correction parameter to the channel state information circuit, wherein the at least one correction parameter is based on a relation between the at least one transport performance indicator and the channel state information, wherein the channel state information previously reported by the network is used by the network for deriving a format of the data received over the radio channel, and wherein the at least one correction parameter and the previously reported channel state information are utilized to determine corrected channel state information when (i) ACK/NACK are available, (ii) the data received over the radio channel corresponds to a new data transmission, (iii) a spectral efficiency of the radio channel matches one of the latest reported CQI in a given time interval, and (iv) a rank of the radio channel matches a rank reported in the given time interval.

22. The device of claim 21, wherein the at least one correction parameter comprises a correction for at least one of the following parameters:

an estimated signal to interference plus noise ratio of the data received over the radio channel, an estimated mutual information of the radio channel, thresholds applicable for determining a channel quality indicator of the radio channel, entries of at least one lookup table determining a mapping of the mutual information versus the channel quality indicator of the radio channel, a mapping of the estimated signal to interference plus noise ratio to a channel quality indicator.

23. A method for providing at least one correction parameter for determining channel state information, the method comprising:

receiving at least one transport performance indicator indicating a performance of data received over a radio channel;

receiving channel state information that has been previously reported to a network and used by the network for deriving a format of the data received over the radio channel;

providing the at least one correction parameter based on a relation between the at least one transport performance indicator and the channel state information; and when a format of the data received over the radio channel data matches the previously reported channel state information, determining corrected channel state information based on the previously reported channel state information and the at least one correction parameter, and wherein the at least one correction parameter and the previously reported channel state information are utilized to determine corrected channel state information when (i) ACK/NACK are available, (ii) the data received over the radio channel corresponds to a new data transmission, (iii) a spectral efficiency of the radio channel matches one of the latest reported CQI in a given time interval, and (iv) a rank of the radio channel matches a rank reported in the given time interval.

* * * * *